Figure 2:
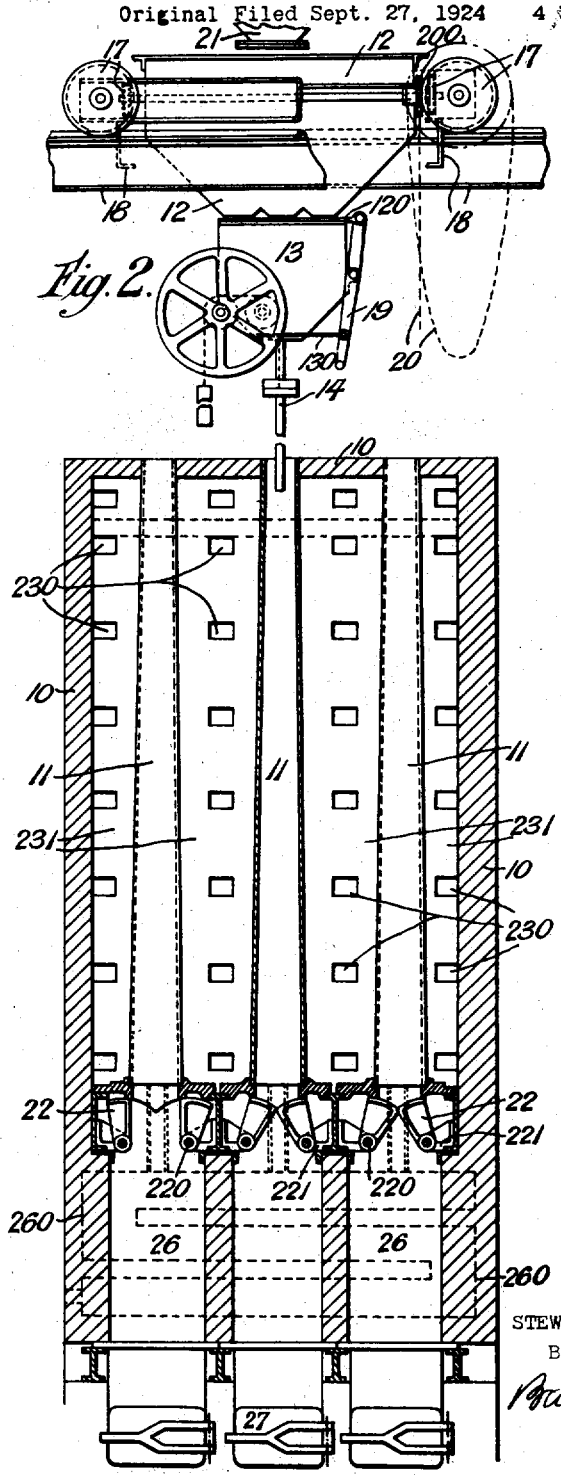

S. R. ILLINGWORTH
Jan. 28, 1930. Re. 17,572
APPARATUS FOR THE MANUFACTURE OF CARBONIZED FUEL
Original Filed Sept. 27, 1924 4 Sheets-Sheet 1
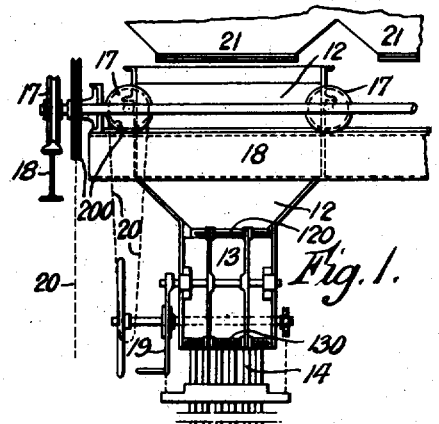
Fig. 1.
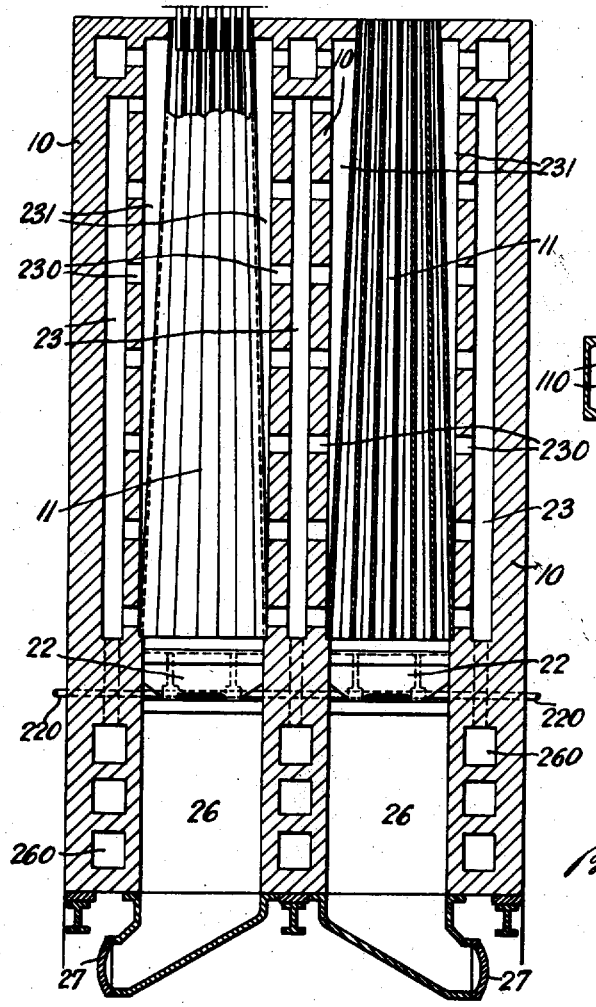
Fig. 3.
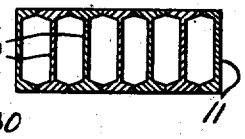
Inventor
STEWART R. ILLINGWORTH
By his Attorneys,
Baldwin & Wight

S. R. ILLINGWORTH

Jan. 28, 1930. Re. 17,572

APPARATUS FOR THE MANUFACTURE OF CARBONIZED FUEL

Original Filed Sept. 27, 1924 4 Sheets-Sheet 2

Inventor
STEWART R. ILLINGWORTH
By his Attorneys,
Baldwin & Wight

S. R. ILLINGWORTH

Jan. 28, 1930. Re. 17,572

APPARATUS FOR THE MANUFACTURE OF CARBONIZED FUEL

Original Filed Sept. 27, 1924 4 Sheets-Sheet 3

Inventor

STEWART R. ILLINGWORTH,

By his Attorneys,

Baldwin & Wight

Jan. 28, 1930. S. R. ILLINGWORTH Re. 17,572

APPARATUS FOR THE MANUFACTURE OF CARBONIZED FUEL

Original Filed Sept. 27, 1924 4 Sheets-Sheet 4

Inventor

SREWART R. ILLINGWORTH

By his Attorneys,

Baldwin & Wight

Reissued Jan. 28, 1930

Re. 17,572

UNITED STATES PATENT OFFICE

STEWART ROY ILLINGWORTH, OF CARDIFF, WALES, ASSIGNOR TO THE ILLINGWORTH CARBONIZATION COMPANY, LIMITED, OF MANCHESTER, ENGLAND

APPARATUS FOR THE MANUFACTURE OF CARBONIZED FUEL

Original No. 1,645,861, dated October 18, 1927, Serial No. 740,339, filed September 27, 1924, and in Great Britain October 29, 1923. Application for reissue filed September 3, 1929. Serial No. 390,223.

This invention relates to apparatus to be used in the manufacture of fuel, and particularly in the manufacture of fuel from coal and wherein the procedure is such as to minimize or in effect prevent the swelling of the fuel.

According to this invention the apparatus comprises a brickwork setting having in it a number of heat conducting plates of iron extending partially across the retort. The plates are preferably of H section in which case flues are arranged at the ends of the plates. The arrangement of the plates is preferably such that there is formed a brick retort setting containing a number of upwardly tapering retorts that are less than 7 inches in width at the base but greater than 2 inches at the top and in which the taper is not less than one tenth of an inch per foot of height.

Above the retort setting is a storage hopper for supplying coals into a number of measuring chambers which are closed at the bottom by a sliding door, and leading from each measuring chamber is a pipe secured to the measuring chamber which can be raised or lowered relatively to the storage hopper.

The retorts are provided with doors and arranged below the retorts are brick or cast iron chambers which may be used either as cooling chambers for the products falling from the retorts when the doors are opened, or they may be used for the further carbonization of these products.

In the first case flues surrounding the chambers are employed for the circulation of air or gas which is led to the flues which surround the retorts and in which combustion takes place.

In the latter case combustion takes place in the flues surrounding the chambers, the hot gases passing to the above mentioned flues surrounding the retorts. A number of horizontal passages lead from these flues to spaces surrounding the retorts.

In the above arrangements the chambers below the retorts or the lower part of the furnace may be used as a gas producer, the hot gases therefrom being led to the flues surrounding the cast iron retorts. Such flues may consist solely of a space between the iron retorts and the walls of the producer. The gases after being cooled by heating the retorts may be mixed with the gases produced in the retorts, the amount of gas generated being regulated by the amount of air supplied. By means of such an arrangement the burners usually situated at the bottom of the furnace can be dispensed with. The amount of gas generated is so adjusted that the sufficient heat is supplied to the retorts to carbonize the coal therein. The carbonized coal which passes downwards into the lower half of the producer (and which is not required for the generation of gas) can be withdrawn from the producer from time to time and utilized for smokeless fuel or coke. Small coal unsuitable for producer work is thus utilized in a producer or converted into smokeless fuel.

Figure 4:
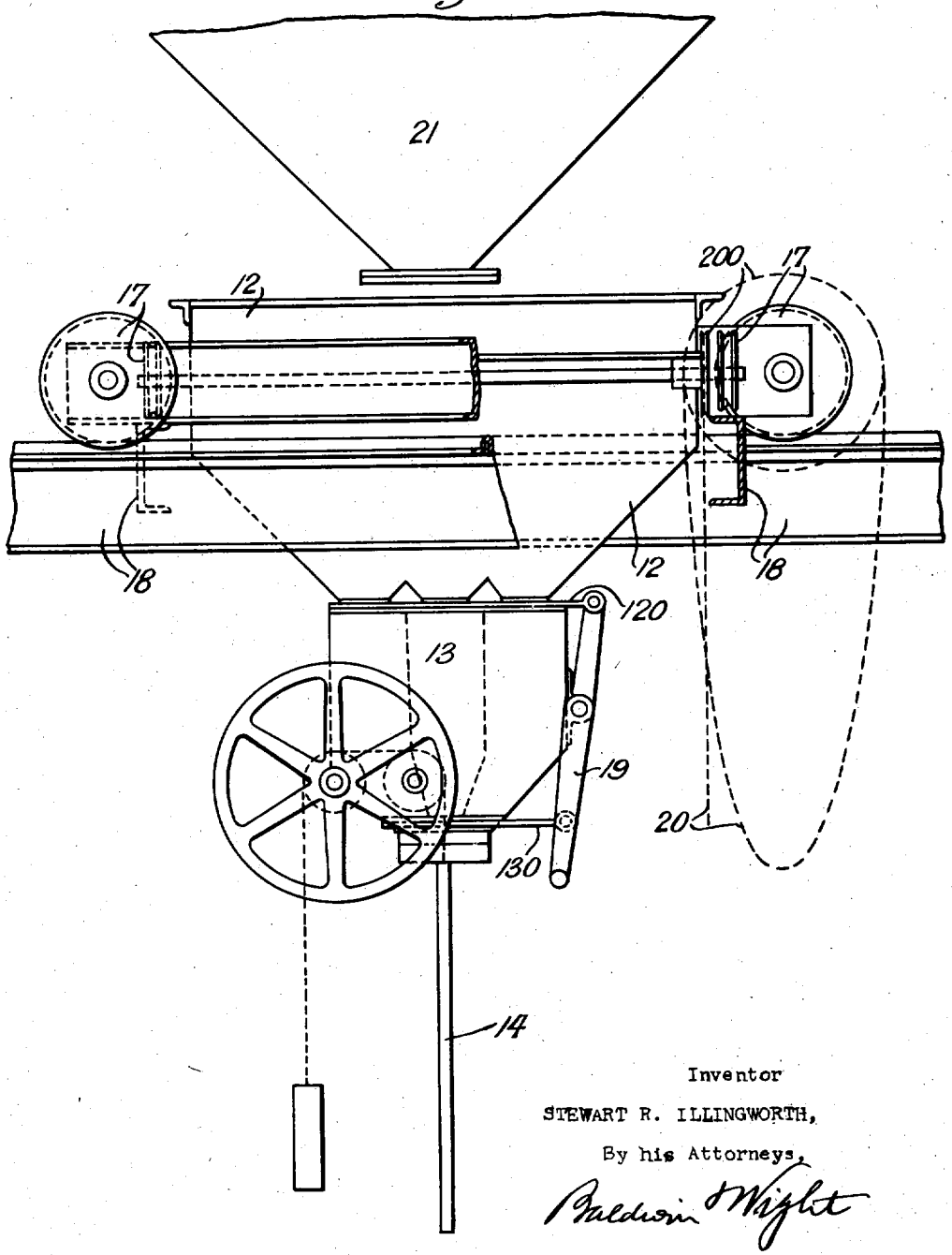
Figure 5:
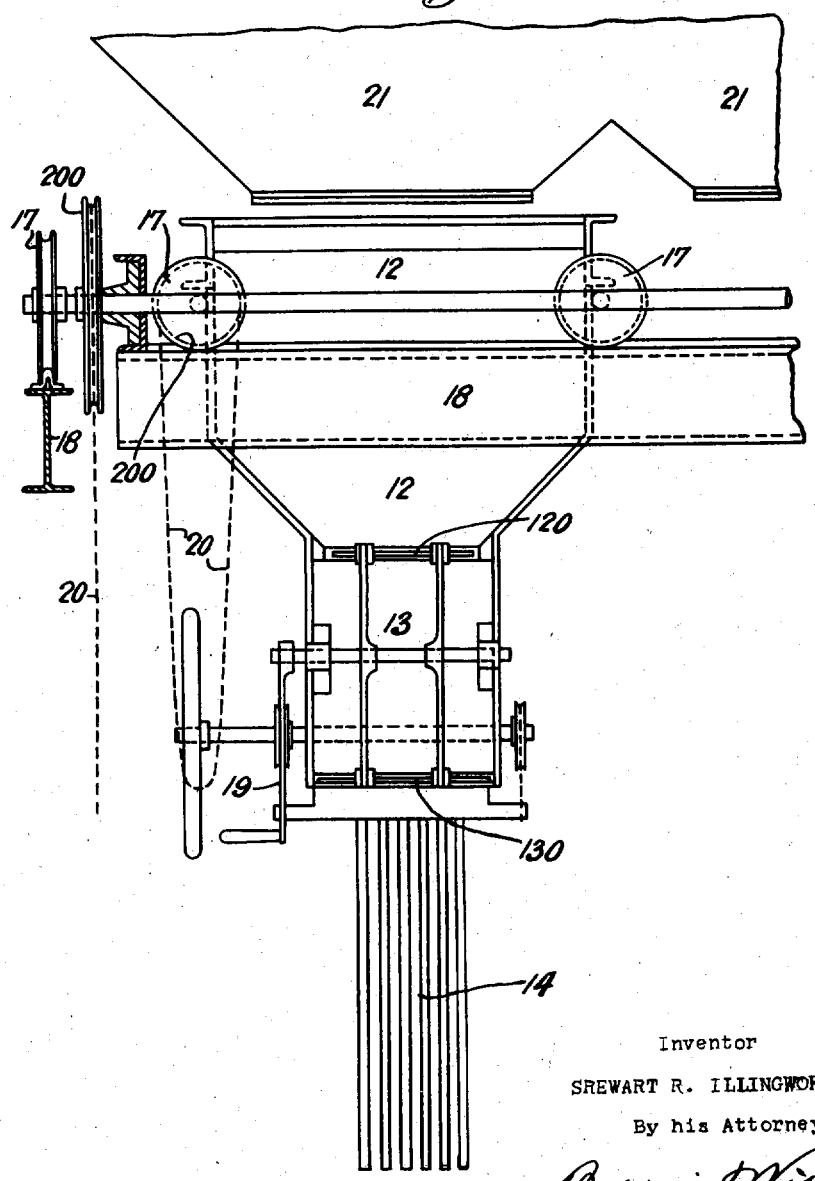

The accompanying drawings show apparatus made in accordance with this invention. Figures 1 and 2 are sections at right angles to one another and Figure 3 is a horizontal section on a larger scale showing the arrangement of the division plates when H section plates are employed. Figures 4 and 5 show on a larger scale the fuel feeding mechanism shown in Figures 1 and 2 and are elevations at right angles to each other.

10 is a vertical retort setting of brick work containing small tapering retorts 11 separated by plates or beams 110 having sections as shown in Figure 3. Above the retort settings 10 is a fuel feed mechanism in which a storage hopper 12 supplying coal to measuring chambers 13 and pipes 14 leading to the retorts are so constructed that they may be mounted on wheels 17 which run in two directions on girders 18 above batteries of retorts 10. A door 120 at the bottom of the hopper 12 and a door 130 at the bottom of the measuring chambers 13 are operated by a common handle 19. The apparatus is traversed along the girders 18 by means of chains 20 and chain wheels 200 and above the batteries of retorts other storage hoppers 21 are provided.

At the bottom of the retorts 11 are doors 22 mounted on shafts 220 turning in bearings 221 and below the retorts 11 are chambers 26 provided with outlet doors 27. Around the chambers 26 are flues 260 which lead to flues 23 in the retort walls and thence by horizontal openings 230 to spaces 231 between the brick walls of the retorts 10 and the outer walls of the small retorts 11.

When the chambers 26 are used as carbonizing chambers the combustion takes place in the flues 260 and hot gases pass to the flues 23, horizontal openings 230 and spaces 231. The retorts 11 may be worked intermittently in which case the discharge doors of the retorts are opened allowing 80–90 per cent of the carbonized product to fall into the chambers 26 below which trucks may be provided and when the retorts are worked continuously the mechanical extractors such as are described in my United States Patent No. 1,496,054, are employed.

It is preferred that the retorts 11 should taper upwards and that the cross section of a retort at its narrowest part should not exceed 7 inches and should be at least 2 inches and that the taper should be not less than one tenth of an inch per foot of height. The retorts 11 may be discharged before the full period of carbonization has taken place, say from 25 to 40% of the full period, depending on the cross section of the retorts. Carbonization is completed in the lower parts of the retorts 10. The temperature employed in the upper half of the retorts 10 may be the same or different from that in the lower part, for example, if smokeless fuel is being made the temperature should be the same, say 600° C., but when coke is being made the upper part should be maintained at 600° C. and the lower part at any higher temperature.

In the forms shown in Figure 3 the outer plates are of channel iron formation while the intermediate plates are H-section. Of course the outer plates might also be H-section if desired. In order to obtain the tapering desired, the outer faces of the H-plates and the channel plates must taper from end to end.

The upper ends of the retorts may be closed during the heating by any desired form of cover which can be moved to inoperative position to promote charging of the retort. Any desired means for drawing off the volatile products from the upper end of the retort may also be provided. These features form no part of the invention claimed and are therefore not illustrative or described in detail.

The coal before being fed to the moulds should be dried and should preferably not contain more than 2 or 3% moisture.

It will be seen that the process described in this specification is similar to that claimed in the specification of my Patent No. 1,496,054 as the coal is supplied to a number of moulds or retorts and is heated to form a briquette with a shell strong enough to prevent the fracture of the briquette in falling from the mould or retort, the briquettes being afterwards delivered from the moulds or retorts into a retort which in the present case is the same retort in which they have already been heated.

The advantage of such a structure as shown in the drawings, is that each heat-transmitting section is free to respond to the conditions encountered—i. e., each section is free, by virtue of its non-attachment to co-operating sections, to expand and contract endwisely in response to temperature variations, and its chemical growth is unhampered. In addition, the fact that each such section is separately and independently formed contributes to the ease of assembling, and the ease of replacement and renewal.

It should also be noted that there is an economic limit to the size of a casting, but by employing independently formed, individual members such as herein contemplated, a large number of such members may be grouped in a brick-enclosed chamber to produce a high capacity unit, with such operating advantages as are inherent in large units.

What I claim is:

1. Apparatus for the manufacture of carbonized fuel comprising a main structure having a heating-chamber, a retort-structure in said chamber comprising beams of iron of H-shape in transverse section arranged in a row substantially parallel and co-extensive with each other and contiguous to each other in pairs with at least one of the channels of each of said beams opposite and facing one of the channels of one of the other beams so as to provide a retort-space therebetween, thereby forming a plurality of small retorts, said retort-structure being spaced from the walls of said chamber, and means for heating said chamber.

2. Apparatus for the manufacture of carbonized fuel comprising a main structure having a heating-chamber, a retort-structure in said chamber comprising beams of iron of H-shape in transverse section extending upwardly and arranged in a row substantially parallel and co-extensive with each other and contiguous to each other in pairs with at least one of the channels of each of said beams opposite and facing one of the channels of one of the other beams so as to provide a retort-space therebetween, thereby forming a plurality of small retorts, said retort-structure being spaced from the walls of said chamber, and means for heating said chamber, said beams tapering upwardly to thereby give a downwardly-flaring shape to each of the retort-spaces.

3. Apparatus for the manufacture of carbonized fuel comprising a main structure having a heating-chamber, a retort-structure in said heating chamber comprising beams of iron of H-shape in transverse section extending upwardly and arranged in a row substantially parallel and co-extensive with each other and contiguous to each other in pairs with at least one of the channels of each of said beams opposite and facing one of the channels of one of the other beams so as to provide a retort-space therebetween, thereby forming a plurality of small retorts, said retort-structure being spaced from the walls of said chamber, and means for heating said chamber, said beams tapering upwardly to thereby give a downwardly-flaring shape to the retorts, each of the retorts being from 2 to 7 inches wide at its narrowest portion and tapering at least one-tenth of an inch per foot of length.

4. Apparatus for the manufacture of carbonized fuel comprising a main structure having a heating-chamber, a retort-structure in said chamber comprising beams of iron of H-shape in transverse section arranged in a row substantially parallel and co-extensive with each other and contiguous to each other in pairs with at least one of the channels of each of said beams opposite and facing one of the channels of one of the other beams so as to provide a retort-space therebetween, thereby forming a plurality of small retorts, and a channel-iron beam at each end of the row of said beams and parallel with said beams and having its flanges in contact with the adjacent flanges of the beam at the same end of said row therewith so as to form an additional small retort at each end of said row.

5. Apparatus for the manufacture of carbonized fuel comprising a main structure having walls enclosing a heating-chamber, a retort-structure supported in said heating-chamber and consisting of a plurality of upwardly-elongated, separate, endwisely-expansible, heat-transmitting sections, said sections being assembled in said heating-chamber so as to cooperate one with the other in subdividing the retort-structure into a plurality of small carbonizing-retorts.

6. Apparatus for the manufacture of carbonized fuel comprising a main structure having a heating-chamber, and a retort-structure in said chamber comprising beams of iron upwardly elongated and provided with flanges along their longitudinal edges, these beams being arranged in a row contiguous to each other to thereby form small elongated retorts between the webs and flanges of adjacent beams, said beams being free to expand endwisely.

7. Apparatus for the manufacture of carbonized fuel comprising a main structure having a heating-chamber, and a retort-structure in said chamber comprising upwardly-elongated separate iron beams, each of said beams being flanged longitudinally, these beams being arranged side-by-side in a row so that their webs and flanges form a plurality of upwardly-elongated small retorts.

8. Apparatus for carbonizing fuel comprising a main structure including a heating-chamber, and an upwardly-elongated retort-structure within said chamber and comprising a plurality of separately-formed longitudinally-flanged metal beams extending lengthwise of said retort structure and co-operating in pairs so as to form a row of narrow retorts extending in parallel relation from the top to the bottom of said retort-structure, said flanges on said beams serving to space the beams apart and being tapered upwardly to thus give a downward flare to the interior of each of the retorts.

9. Apparatus for carbonizing fuel comprising a main structure having walls enclosing a heating-chamber, a retort-structure supported in said heating-chamber and comprising a plurality of upwardly elongated separately-formed heat-transmitting members having longitudinally-extending spacing-flanges formed thereon and cooperating one with the other so as to form a plurality of small retorts extending in approximately parallel relation from the top to the bottom of said retort-structure.

In testimony whereof, I hereunto affix my signature.

STEWART ROY ILLINGWORTH.